US010200286B2

(12) United States Patent
Venkataswami et al.

(10) Patent No.: US 10,200,286 B2
(45) Date of Patent: Feb. 5, 2019

(54) SYSTEMS AND METHODS FOR LOAD BALANCING IN A DATA CENTER (71) Applicant: DELL PRODUCTS L.P., Round Rock, TX (US)

(72) Inventors: Balaji Venkat Venkataswami, Tamil Nadu (IN); Bhargav Bhikkaji, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 152 days.

(21) Appl. No.: 15/192,294

(22) Filed: Jun. 24, 2016

(65) Prior Publication Data

US 2016/0308772 A1  Oct. 20, 2016

Related U.S. Application Data (63) Continuation of application No. 14/260,103, filed on Apr. 23, 2014, now Pat. No. 9,413,668.

(51) Int. Cl.
*H04L 12/803* (2013.01)
*H04L 12/66* (2006.01)
*H04L 12/751* (2013.01)
*H04L 12/707* (2013.01)
*H04L 12/703* (2013.01)
*H04L 12/743* (2013.01)
*H04L 12/733* (2013.01)
*H04L 12/741* (2013.01)

(52) U.S. Cl.
CPC ............ *H04L 47/125* (2013.01); *H04L 12/66* (2013.01); *H04L 45/02* (2013.01); *H04L 45/20* (2013.01); *H04L 45/24* (2013.01); *H04L 45/28* (2013.01); *H04L 45/7453* (2013.01); *H04L 45/54* (2013.01)

(58) Field of Classification Search
CPC ......... H04L 45/28; H04L 45/22; H04L 45/00; H04L 1/22; H04J 3/14
See application file for complete search history.

(56) References Cited

U.S. PATENT DOCUMENTS

| | | | | |
|---|---|---|---|---|
| 6,603,765 B1 * | 8/2003 | Wilford | ................. | H04L 29/06 370/395.32 |
| 7,362,708 B2 * | 4/2008 | Cristallo | ................. | H04L 47/10 370/235 |
| 7,512,702 B1 * | 3/2009 | Srivastava | .............. | H04L 45/00 370/236 |
| 7,609,619 B2 | 10/2009 | Naseh | .......................... | 370/225 |
| 8,014,278 B1 * | 9/2011 | Subramanian | ...... | H04L 12/2867 370/229 |

(Continued)

*Primary Examiner* — Mark H Rinehart
*Assistant Examiner* — Sanjay K Dewan
(74) *Attorney, Agent, or Firm* — Haynes and Boone, LLP.

(57) ABSTRACT

Methods of load-balancing in a network are provided herein. One such method includes steps of receiving network traffic at a network device, the network traffic having a destination address and of performing a look-up in a multipath group table using the destination address. The multipath group table includes entries for recursive next-hops, each recursive next hop being associated with a connected next hop in the multipath group table. The method also include a step of hashing the network traffic according to a number of recursive next-hops associated with the destination address in the multipath group table. Additional methods and information handling system are also provided.

14 Claims, 6 Drawing Sheets

(56) References Cited

U.S. PATENT DOCUMENTS

| | | | |
|---|---|---|---|
| 8,072,952 B2 | 12/2011 | Aragon | 370/338 |
| 8,194,546 B2 * | 6/2012 | Vasseur | H04L 45/10 370/235 |
| 8,213,298 B2 * | 7/2012 | Yamaguchi | H04L 45/12 370/217 |
| 8,307,415 B2 | 11/2012 | Khan | 713/152 |
| 8,355,328 B2 | 1/2013 | Matthews | 370/235 |
| 8,553,562 B2 * | 10/2013 | Allan | H04L 45/125 370/238 |
| 8,614,950 B2 | 12/2013 | Roitshtein | 370/229 |
| 8,855,082 B2 | 10/2014 | Grayson | 370/328 |
| 8,879,397 B2 * | 11/2014 | Xi | H04L 43/0882 370/237 |
| 8,938,469 B1 | 1/2015 | Keen | |
| 8,953,623 B1 | 2/2015 | Eyada | 370/401 |
| 8,972,502 B2 | 3/2015 | Mithyantha | 370/235 |
| 9,036,476 B2 | 5/2015 | Grandhi | 370/235 |
| 9,166,817 B2 * | 10/2015 | Schlansker | H04L 12/462 |
| 9,270,566 B2 | 2/2016 | Wang | |
| 2001/0052016 A1 * | 12/2001 | Skene | G06F 9/505 709/226 |
| 2006/0067503 A1 * | 3/2006 | Caugherty | H04Q 3/0025 379/221.07 |
| 2006/0193252 A1 * | 8/2006 | Naseh | H04L 45/04 370/225 |
| 2007/0177506 A1 * | 8/2007 | Singer | H04L 45/00 370/235 |
| 2008/0114892 A1 | 5/2008 | Bruno | 709/234 |
| 2009/0303880 A1 * | 12/2009 | Maltz | H04L 45/02 370/235 |
| 2011/0026403 A1 | 2/2011 | Shao | 370/235 |
| 2011/0273987 A1 | 11/2011 | Schlansker | 370/235 |
| 2012/0029720 A1 | 2/2012 | Cherian | 700/297 |
| 2013/0077490 A1 | 3/2013 | Sela | 370/235 |
| 2014/0269268 A1 * | 9/2014 | Rao | H04L 47/125 370/229 |
| 2014/0293786 A1 | 10/2014 | Lin | 370/235 |
| 2014/0362705 A1 * | 12/2014 | Pan | H04L 47/125 370/237 |
| 2015/0036493 A1 | 2/2015 | Cj | 370/235 |
| 2015/0103659 A1 | 4/2015 | Lles | 370/235 |
| 2015/0127797 A1 | 5/2015 | Attar | 709/223 |
| 2017/0353544 A1 * | 12/2017 | Lala | H04L 67/1036 |

\* cited by examiner

SYSTEMS AND METHODS FOR LOAD BALANCING IN A DATA CENTER

CROSS-REFERENCED APPLICATIONS

The present application is a continuation of U.S. patent application Ser. No. 14/260,103 filed on Apr. 23, 2014, which is incorporated by reference in its entirety.

BACKGROUND

1. Technical Field

The present disclosure is related to information handling systems. In particular, embodiments disclosed herein are related to data center implementation and management including load-balancing within the data center.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, there is increasing demand and use of data centers to provide businesses and consumers with access to vast amounts of data and services. Some data centers include large numbers of servers networked together by a layer of top-of-rack switches, which in turn are coupled to a layer of leaf switches, which are further coupled to a layer of spine switches. Large amounts of network traffic may pass through these tiers of network devices as information is exchanged between servers within the data center and between other devices outside the data center. A number of techniques for load-balancing have been developed such as equal-cost multi-path (ECMP) routing. However, such techniques have not been entirely satisfactory.

Therefore, there is a need for better load balancing techniques.

SUMMARY

Consistent with some embodiments, there is provided an information handling system. The information handling system includes one or more processors in communication with a memory and one or more network device interfaces configured to communicate with at least some of the plurality of tiers of network devices. The one or more processors provides a plurality of modules that includes a topology processing module configured to identify a topology that includes plurality of tiers of network devices coupled to the information handling system and a forwarding information base module configured to create and modify multipath group entries in a forwarding information table stored in the memory.

Consistent with some embodiments, there is further provided a method for load-balancing in a network or data center. The method includes steps of identifying a plurality of directly connected network devices coupled to a first network device and of identifying a plurality of subsequent network devices. The subsequent network devices are configured in one or more tiers and coupled to the first network device through the directly connected network devices and to a prefixed destination. The method includes a step of configuring a plurality of multipath groups in a multipath group table present in a memory of the first network device, wherein the multipath group table includes one multipath group table entry for each subsequent network device in one of the one or more tiers. Additional the method includes a step of computing a load-share value based on a number of available subsequent network devices in the one of the one or more tiers.

Consistent with some embodiments, there is further provided another method for load-balancing in a network or data center. The method includes steps of receiving network traffic at a network device the network traffic having a destination address and of performing a look-up in a multipath group table using the destination address. The multipath group table includes entries for recursive next-hops, each recursive next hop being associated with a connected next hop in the multipath group table. The method also includes a step of hashing the network traffic according to a number of recursive next-hops associated with the destination address in the multipath group table.

These and other embodiments will be described in further detail below with respect to the following figures.

For clarity of discussion, elements having the same designation in the drawings may have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Additionally, some embodiments of information handling systems include non-transient, tangible machine-readable media that include executable code that when run by a processor, may cause the processor to perform the steps of methods described herein. Some common forms of machine-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 1:
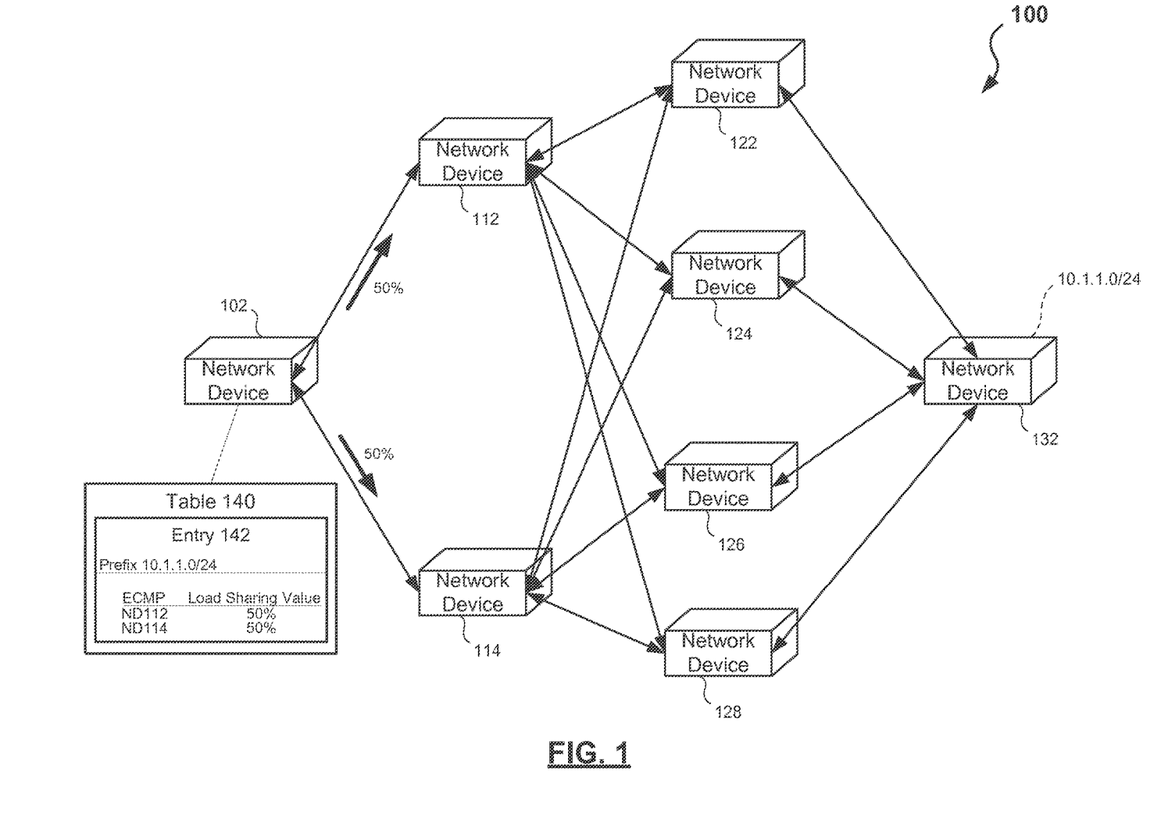
FIG. 1 is a diagram of an information handling system having a plurality of network devices coupled in a network.

FIG. 1 depicts an information handling system 100 that includes a plurality of network devices. The plurality of networked devices in the information handling system 100 includes several tiers of network devices. For example, some embodiments of the information handling system 100 include a plurality of spine devices coupled to a plurality of leaf devices that, in turn, are coupled to a plurality of top-of-rack (TOR) switches. In turn, the TORs are coupled to one or more servers. In the depicted embodiment, information handling system 100 is a data center. Information may be communicated through the information handling system 100 as layer 3 traffic, layer 2 traffic, or as a combination thereof.

As illustrated in FIG. 1, the information handling system 100 includes a first network device 102. Network device 102 may be a layer 3 device, or a device capable of handling both layer 3 and layer 2 traffic, and is coupled to network devices 112 and 114. As shown in FIG. 1, the network devices 112 and 114 are directly connected to the network device 102. The network devices 112 and 114 may be referred to herein as directly connected next-hops or forwarding next-hops.

In turn, the network devices 112 and 114 are each connected to another tier of devices that includes network devices 122, 124, 126, and 128 the network devices 122, 124, 126, and 128 are coupled to the network device 102 through the network devices 112 and 114. Additionally, each of the network devices 122-128 is coupled to a network device 132. Network devices 122-128 may be referred to herein as recursive next-hops or as subsequent network devices. The network devices in the information handling system 100 are coupled by a plurality of bidirectional communication links by which network traffic is routed and/or forwarded through the information handling system 100. Some embodiments of the information handling system 100 include many more network devices in each of the tiers present. For example, some embodiments may include four directly connected next-hops and eight re-cursive next-hops. As illustrated, the information handling system 100 facilitates a simplified Description of certain features. Additionally, while the information handling system 100 is symmetric as illustrated, other embodiments of the information handling system 100 may be asymmetric.

As illustrated, the network device 132 provides access to a plurality of other devices, such as a plurality of servers (not shown), that are addressed by a prefix. As an example, the plurality of devices addressed by prefix 10.1.1.0/24 may be accessible through the network device 132. In operation, the network device 102 includes a forwarding information base or forwarding table stored in a memory. The table associates addresses of networked devices in the information handling system 100 with interfaces on the network device 102 to direct the flow of traffic received by the network device 102. An exemplary table 140 is provided in FIG. 1, which includes an exemplary entry 142. The entry 142 directs that traffic received on a network device 102 that includes the prefix 10.1.1.0/24 is transmitted according to the equal-cost multi path (ECMP) protocol. The entry 142 includes a multipath group or ECMP group in which a hashing algorithm is used to direct 50% of the network traffic with the prefix to the network device 112 and the other 50% of the network traffic with the prefix to the network device 114. Thus, the table 140 directs load balancing through the information handling system 100. The load-balancing performed by the network device 102 helps to improve the performance of the information handling system 100 by properly using the available Network Resources and bandwidth. To transmit packets according to the entry 142, packets may be encapsulated with a header associated with one of the network devices 114 and 111.

Figure 2:
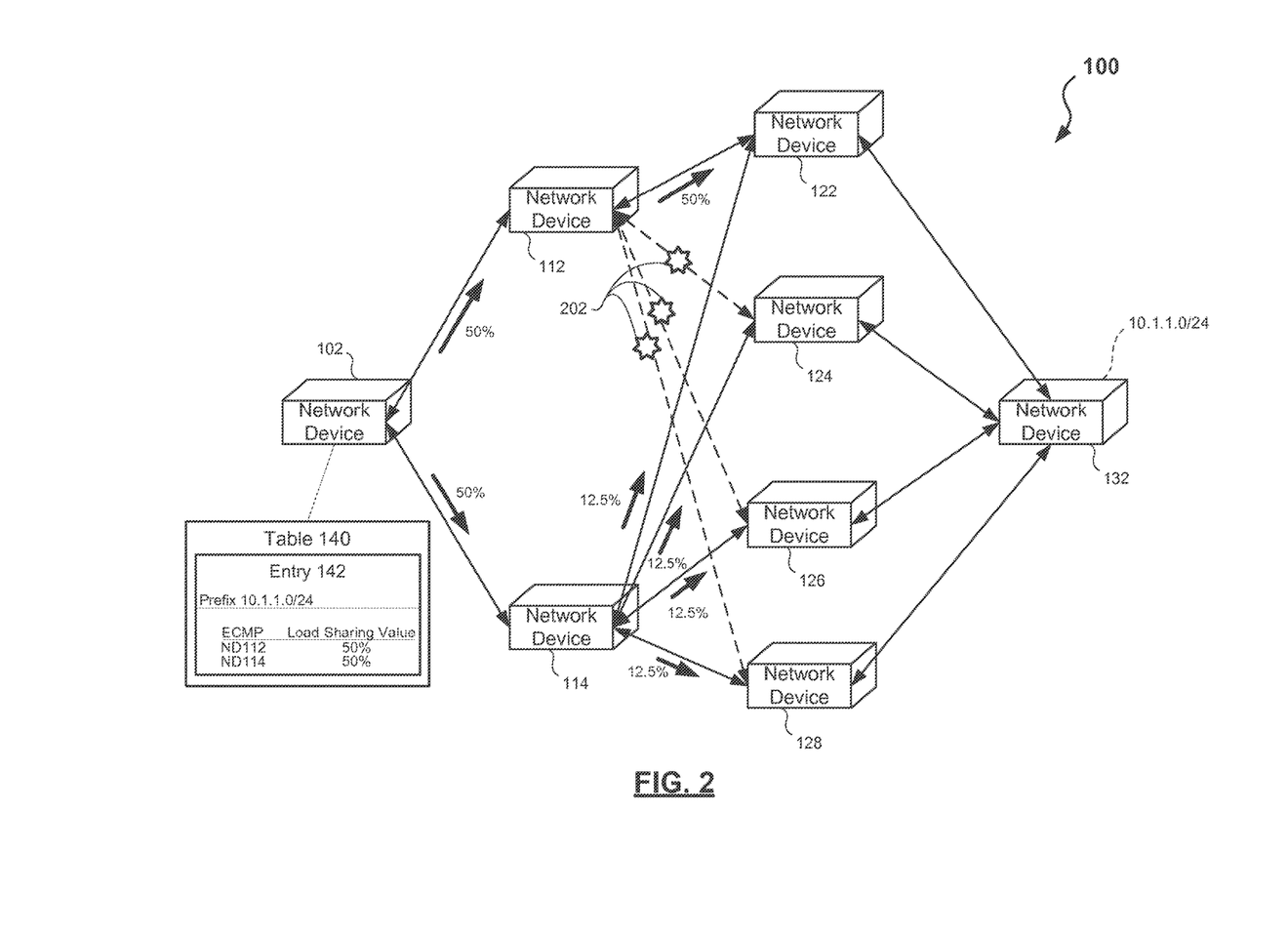
FIG. 2 is a diagram of the information handling system of FIG. 1 with a number of network failures present.

Referring now to FIG. 2, shown therein are several network failures 202. The network failures prevent traffic from flowing between the network device 112 and the network devices 124. As indicated by the entry 142, 50% of the network traffic received by the network device 102 that includes the prefix 10.1.1.0/24 is being sent to the network device 112. Because of the network failures 202, this results in 50% of the related network traffic being transmitted to the network device 132 on the link coupling the network device 112 to the network device 122. Depending on the volume of traffic to the prefix 10.1.1.0/24 and/or other network traffic being transmitted from the network device 112 to network device 122, the link may become overloaded resulting in delayed and/or dropped packets. Thus, while the multipath group included in entry 142 may improve the performance of the information handling system 100 in some conditions, in other conditions little improvement may be provided.

Figure 3:
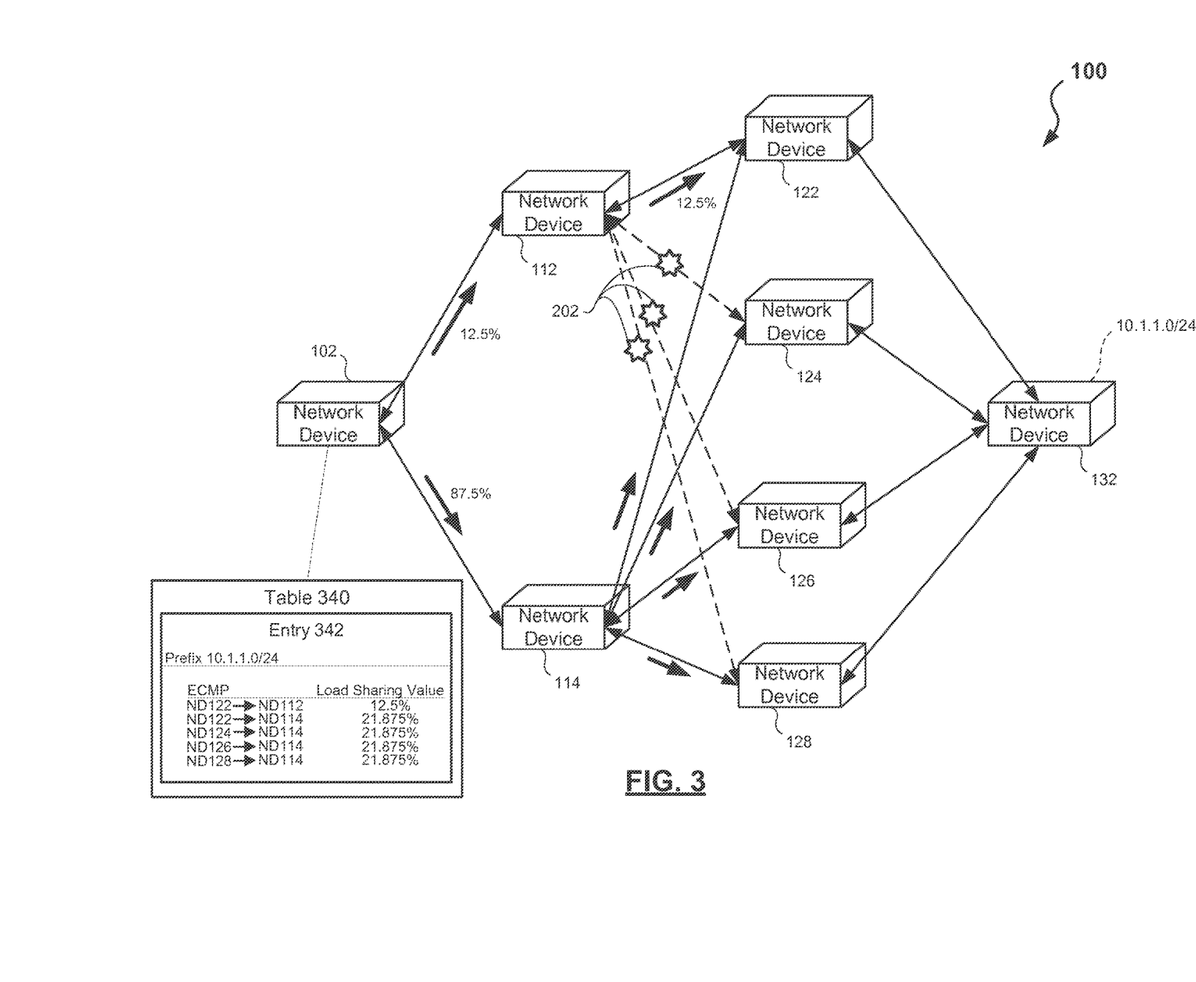
FIG. 3 is a diagram of an information handling system configured to perform load balancing according to some embodiments.

Referring now to FIG. 3, the information handling system 100 is shown therein with an alternative load-balancing scheme. The network device 102 received or collects topology information. For example, in some embodiments a network controller collects topology information from the network devices in the information handling system 100 and distributes topology information to each of the network devices. Rather than using the directly connected network devices 112 and 114 to determine the proper load-balancing, the network device 102 is configured to use information regarding other tiers within the network. For example, the network device 102 may use the number of network devices in the largest tier in the information handling system 100 to determine load-balancing. As illustrated, the network device 102 may form a multipath group based on the presence of the four network devices 122-128, which form one tier in the information handling system 100. When a network failure is detected, the change in network topology is used to adjust the load sharing values present in a table 340. For example, the load sharing value for each of the remaining links between the network devices 112 and 114 on one hand and the network devices 122-128 on the other may be assigned equally. So, given the five remaining links (i.e. the links between the network devices 112 and 122 and between the network device 114 and network devices 122-128), the traffic may be split equally among them. Such a load-sharing arrangement results in a distribution of 20% of the traffic on the link between the network device 102 and the network device 112 and 80% of the traffic on the link between the network device 102 and the network device 114.

However, as illustrated in FIG. 3, the load sharing value is not calculated such that traffic is born equally on all of the available links between the network devices 112 and 114 and the network devices 122-128. Instead, the traffic that would have been carried over the links between the network device 112 and the network devices 124-128 is directed by the network device 102 through the network device 114. This may result in an increase in traffic on each of the links between the network device 114 and the network devices 122-128. According to this load-sharing scheme, only 12.5% of network traffic is directed to the network device 112, through the network device 122 to the network device 132. The link between the network device 112 and the network device 122 is treated as a fragile link, such that no extra traffic is present on that link due to the failure of the links between network device 112 and network devices 124-128. Other embodiments may include other load-sharing values based on the number of available recursive next-hops like the network devices 122-128. The load-sharing values may be determined by the network device 102 or by a network controller, such as a software defined network controller, in communication with the information handling system 100.

Figure 4:
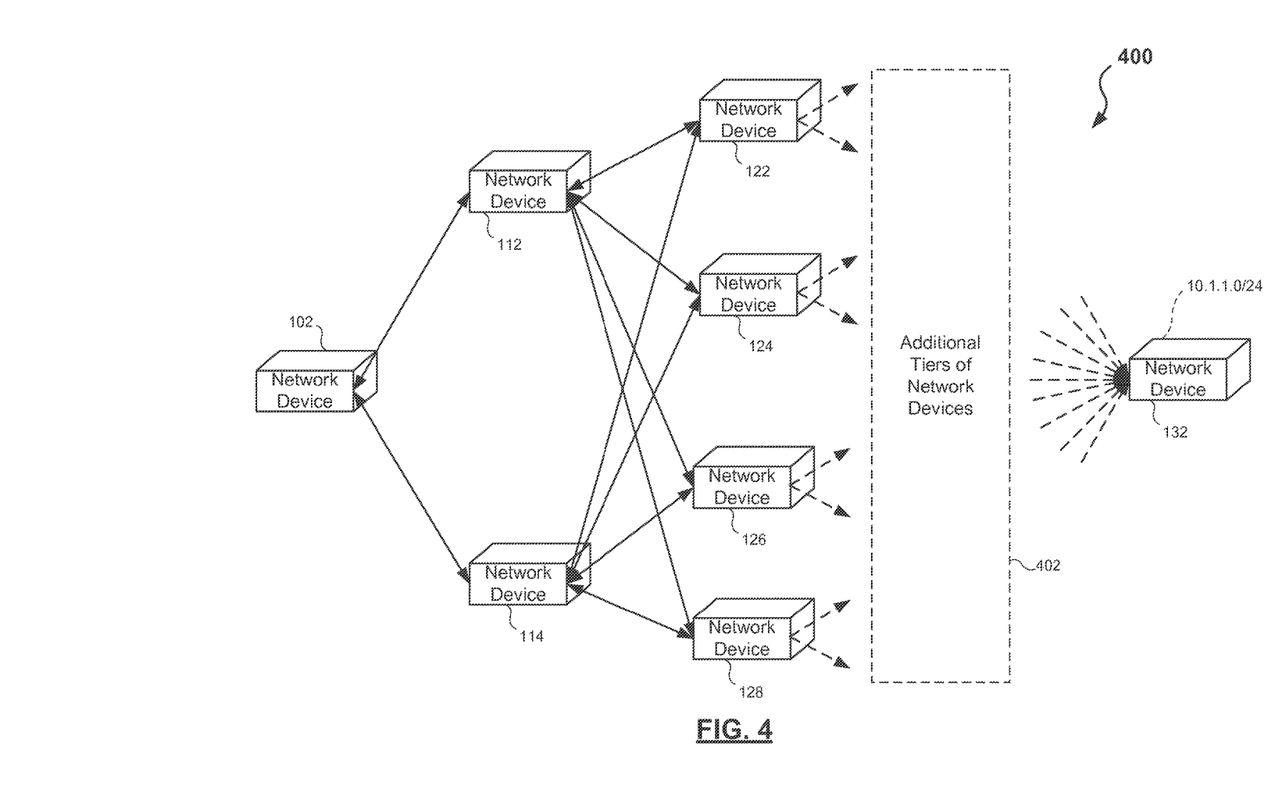
FIG. 4 is a diagram of another information handling system configured to perform load balancing according to some embodiments.

FIG. 4 shows an information handling system 400 that is similar in many respects to the information handling system 100 of FIGS. 1-3. In addition to the features illustrated in FIGS. 1-3 and described herein, the information handling system 400 includes additional tiers 402 of network devices. The additional tiers 402 are coupled to the network devices 122-128 on one hand and to the network device 132 on the other. Thus, in addition to the directly connected next-hops of network devices 112 and 114, and the recursive next-hops of network devices 122-128, the information handling system 400 may further include next-next-hops and next-next-next-hops. Multipath groups may be included in the network device 102 that include load-sharing values based on these additional network devices. For example, the load-sharing may be based on the tier of network devices having the largest number of network devices.

Figure 5:
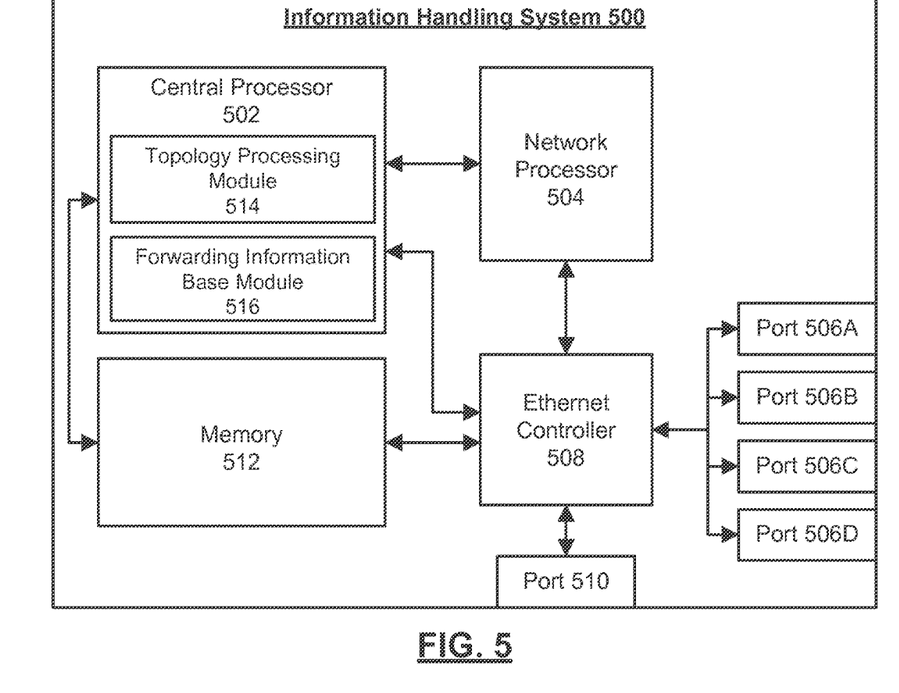
FIG. 5 is a diagram of an information handling system such as may be used as a network device in the information handling systems of figure's three and four according to some embodiments.

FIG. 5 is a diagram of an information handling system 500. The information handling system 500 provides an example of the network devices disclosed in information handling systems 100 and 400 as seen in FIGS. 1-4 and described herein. For example, the information handling system 500 may be the network device 102 of FIGS. 1-4. The illustrated embodiment of the information handling system 500 includes a plurality of processors including a central processor 502 in communication with a network processor 504. For example, the network processor 504 may be part of a network interface card (NIC) in communication with a plurality of interfaces or ports 506A, 506B, 506C, and 506D through an Ethernet controller 508. Some embodiments of the information handling system 500 may include more or fewer interfaces than illustrated. The central processor 502 may also communicate with the Ethernet controller 508, which may be in communication with the ports 506A-D and/or with a dedicated port 510.

The information handling system 500 further includes a memory 512. The memory 512 may include multiple types and/or levels of memory. Thus, embodiments of the information handling system 500 may include RAM, ROM, a hard disk drive, a solid-state drive, and/or other types of memory. The memory 512 store computer programs or software such as an operating system and software program providing management of an extended bridge. For example, the memory 512 may store one or more programs that provide additional functionality of the information handling system 500 when executed by one or more of the processors thereof.

The central processor 502 is illustrated as providing a plurality of modules. In some embodiments, these modules may be provided by discrete circuitry, by software being executed by the one or more processors, or by a combination thereof. As illustrated, the central processor 502 includes a topology processing module 514. The topology processing module 514 may be configured to receive information from other devices coupled to the information handling system 500 in a network or data center and process the information to create a topology. In some embodiments, the topology processing module 514 is configured to receive a topology or topological information from a network controller. The topology indicates links present between coupled network devices and may be updated to reflect changes in the topology (such as changes due to network failures) periodically or on an event-driven basis.

Some embodiments of the information handling systems 100 and 400 use a border gateway protocol (BGP) as an interior gateway protocol (IGP). In such instances, the BGP link-state information may be used to create the topology. Additionally, in some embodiments BGP strands are used to compute the topology. An example of the use of BGP strands to create a topology is found in U.S. patent application Ser. No. 13/750,507, entitled "System and Method for Topology Discovery and Application in a Border Gateway Protocol Based Data Center," filed on Dec. 20, 2012, which is incorporated herein in its entirety.

A forwarding information base module 516 is provided by the information handling system 500 to create the tables as described, herein, such as the table 340 with the entry 342. The forwarding information base module 516 is configured to use topological information to form multipath groups and to determine load-sharing values as described herein.

Figure 6:
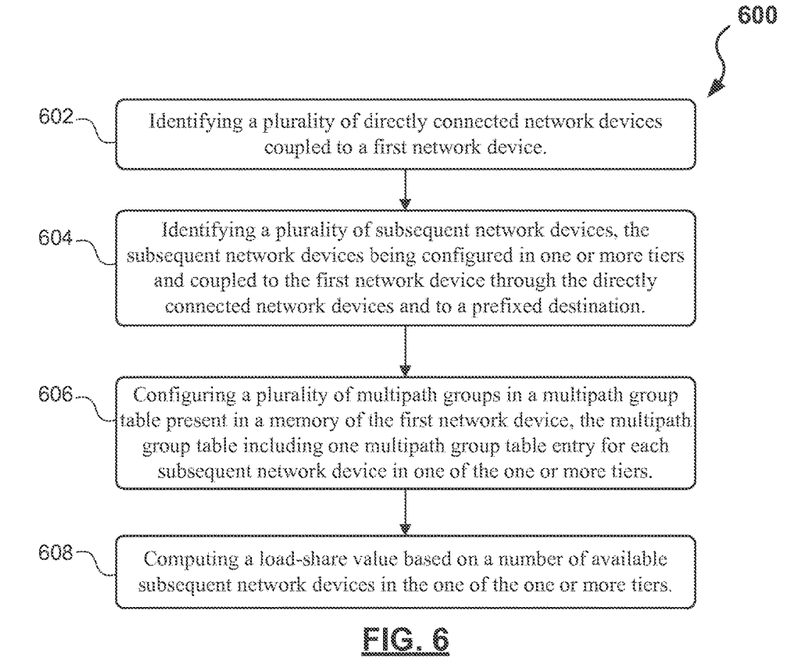
FIG. 6 is a flowchart of a method of load balancing in a network according to some embodiments.

FIG. 6 is a flowchart of a method 600 of load-balancing in a network, such as a data center. As illustrated in FIG. 6, the method 600 includes several enumerated steps. However, embodiments of the method 600 may include additional steps before, after, in between, and/or as part of the enumerated steps. As illustrated, the method 600 begins in step 602 in which a plurality of directly connected network devices coupled to a first network device are identified. For example, the network devices 112 and 114 are identified as being coupled to the network device 102. In step 604, a plurality of subsequent network devices are identified. The subsequent network devices are configured in one or more tiers and are coupled to the first network device through the directly connected network devices and to a prefixed destination. As seen in FIG. 3, for example, the subsequent network devices 122-128 are coupled to the network device 102 through the network devices 112 and 114.

In step 606, a plurality of multipath groups is configured in a multipath group table present in a memory of the first network device. The multipath group table includes one multipath group table entry for each subsequent network device in one of the one or more tiers. An example of such a table is found in the table 340 of FIG. 3. In step 608, a load-share value is computed based on a number of available subsequent network devices in the one of the one or more tiers. An example of load-sharing values is also presented m the table 340 of FIG. 3.

Figure 7:
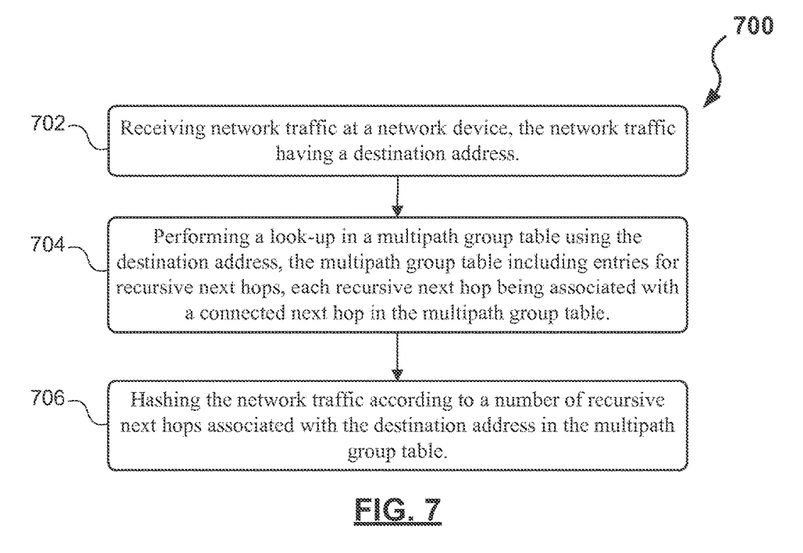
FIG. 7 is a flowchart of another method of load balancing in a network according to some embodiments.

FIG. 7 is a flowchart of a method 700 of load-balancing in a network. The method may be performed by a device like the information handling system 500 within a network such as the information handling system 100 of FIG. 3. As illustrated in FIG. 7, the method 700 includes several enumerated steps. However, embodiments of the method 700 may include additional steps before, after, in between, and/or as part of the enumerated steps. As illustrated, the method 700 begins in step 702 in which network traffic is received at a network device. The network traffic having a destination address as indicated by a prefix or an individual address. In step 704, a look-up in a multipath group table is performed using the destination address. The multipath group table includes entries for recursive next-hops, each recursive next hop being associated with a connected next hop in the multipath group table. An example may be seen in the entry 342 in table 340 of FIG. 3. In step 706, the network traffic is hashed according to a number of recursive next-hops associated with the destination address in the multipath group table.

Some embodiments of information handling systems 100, 400, and 500 include non-transient, tangible, machine-readable media that include executable code that when run by a processor, such as central processor 502 of information handling system 500 of FIG. 5, may cause the processor to perform some or all of the steps of methods 600 and/or 700 as described herein. Some common forms of machine-readable media that may include the steps of methods 600 and 700 are, for example, floppy disk, flexible disk, hard disk, magnetic tape, any other magnetic medium, CD-ROM, any other optical medium, punch cards, paper tape, any other physical medium with patterns of holes, RAM, PROM, EPROM FLASH-EPROM, any other memory chip or cartridge, and/or any other medium from which a processor or computer is adapted to read. The machine-readable media may be memory 512 of FIG. 5.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A network device, comprising:
one or more processors;
one or more ports coupled to the one or more processors and configured to couple the network device to a plurality of first network devices over a network;
wherein the one or more processors are configured to:
determine, in response to a topology change, a number of one or more first routes out of a first one of the first network devices that are currently available to reach a prefixed destination;
determine, in response to the topology change, load share values for the first network devices based on the determined number of one or more first routes, each load share value for a first network device being associated with a link associated with the first network device, wherein the link couples the first network device to a next hop on a route to the prefixed destination; and
forward traffic to the first network devices based on the determined load share values;
wherein in response to the topology change, the load share values are determined such that:
if the topology change comprises a failure of one or more links ("failed links") associated with a given first network device but there is no failure of any link associated with any other first network device, then a non-failed link's load share value depends on whether or not the non-failed link is associated with the said given first network device such that:
if the non-failed link is not associated with said given first network device, then the non-failed link's load share value is increased; and
if the non-failed link is associated with said given first network device, then the non-failed link's load share value is not increased.

2. The network device of claim 1, wherein the topology change corresponds to a network failure along one or more of the one or more first routes.

3. The network device of claim 2, wherein the one or more processors are further configured to determine the load share values such that an amount of traffic apportioned to the first one of the first network devices is reduced in response to the network failure.

4. The network device of claim 1, wherein the topology change corresponds to detecting a new equal cost path out of the first one of the first network devices currently available to reach the prefixed destination.

5. The network device of claim 1, wherein the one or more processors are further configured to update a multipath group table present in a memory of the network device, the multipath group table including one multipath group table entry for each of one or more second routes, through the first network devices, that are available to reach the prefixed destination.

6. The network device of claim 1, wherein each of the one or more first routes that are currently available to reach the prefixed destination provide an equal cost path (ECP) to the prefixed destination.

7. The network device of claim 1, wherein the network is using a border gateway protocol as its interior gateway protocol.

8. A method of load balancing in a network, the method comprising:
determining, by a processor in a networking device and in response to a topology change, a number of one or more first routes out of a plurality of first network devices that are currently available to reach a prefixed destination;
determining, in response to the topology change, load share values for the first network devices based on the determined number of one or more first routes, each load share value for a first network device being associated with a link associated with the first network device, wherein the link couples the first network device to a next hop on a route to the prefixed destination; and forwarding traffic to the first network devices based on the determined load share values;

wherein in response to the topology change, the load share values are determined such that:

if the topology change comprises a failure of one or more links ("failed links") associated with a given first network device but there is no failure of any link associated with any other first network device, then a non-failed link's load share value depends on whether or not the non-failed link is associated with the said given first network device such that:

if the non-failed link is not associated with said given first network device, then the non-failed link's load share value is increased; and if the non-failed link is associated with said given first network device, then the non-failed link's load share value is not increased.

9. The method of claim 8, further wherein the topology change corresponds to a network failure along one or more of the one or more first routes.

10. The method of claim 9, further comprising determining the load share values such that an amount of traffic apportioned to the first one of the first network devices is reduced in response to the network failure.

11. The method of claim 8, wherein the topology change corresponds to detecting a new equal cost path out of the first one of the first network devices currently available to reach the prefixed destination.

12. The method of claim 8, further comprising updating a multipath group table present in a memory of the network device, the multipath group table including one multipath group table entry for each of one or more second routes, through the first network devices, that are available to reach the prefixed destination.

13. The method of claim 8, wherein each of the one or more first routes that are currently available to reach the prefixed destination provide an equal cost path (ECP) to the prefixed destination.

14. The method of claim 8, wherein the network is using a border gateway protocol as its interior gateway protocol.

* * * * *